(12) United States Patent
Vassilieva et al.

(10) Patent No.: US 10,530,490 B1
(45) Date of Patent: Jan. 7, 2020

(54) PROBABILISTIC CONSTELLATION SHAPING FOR OPTICAL NETWORKS WITH DIVERSE TRANSMISSION MEDIA

(71) Applicant: Fujitsu Limited, Kawasaki-shi, Kanagawa (JP)

(72) Inventors: Olga I. Vassilieva, Plano, TX (US); Inwoong Kim, Allen, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/287,409

(22) Filed: Feb. 27, 2019

(51) Int. Cl.
*H04B 10/61* (2013.01)
*H04B 10/079* (2013.01)
*H04B 10/516* (2013.01)

(52) U.S. Cl.
CPC ....... *H04B 10/612* (2013.01); *H04B 10/0799* (2013.01); *H04B 10/07953* (2013.01); *H04B 10/5161* (2013.01); *H04B 10/616* (2013.01)

(58) Field of Classification Search
CPC ............... H04B 10/612; H04B 10/616; H04B 10/0799; H04B 10/07953; H04B 10/5161
USPC .......................................................... 398/26
See application file for complete search history.

(56) References Cited

U.S. PATENT DOCUMENTS

2012/0257896 A1* 10/2012 Djordjevic ........... H04B 10/548 398/65
2014/0140693 A1* 5/2014 Mikhailov ......... H04B 10/0775 398/29
2015/0086193 A1* 3/2015 Liu .................... H04B 10/2543 398/28
2015/0229437 A1* 8/2015 Djordjevic .......... H04L 27/3405 714/776
2016/0373190 A1* 12/2016 Reimer .............. H04B 10/2507
2018/0269979 A1* 9/2018 Zhang ................ H04B 10/5161

(Continued)

OTHER PUBLICATIONS

Buchali, Fred, et al. "Rate adaptation and reach increase by probabilistically shaped 64-QAM: An experimental demonstration." *Journal of Lightwave Technology* 34.7 (2016): 1599-1609; 11 pages.

(Continued)

*Primary Examiner* — Dalzid E Singh
(74) *Attorney, Agent, or Firm* — Baker Botts L.L.P.

(57) ABSTRACT

Systems and methods for constellation shaping of QAM modulation formats in an optical transport network may include selecting a target information rate for an optical transmission path, determining a measure of fiber nonlinearity for transmission media on the path, and selecting, dependent on the measure of fiber nonlinearity, one of multiple supported shaping parameter pairs, each specifying a respective shaping strength level and a respective error correction strength level. A network management system may configure optical transponders to apply probabilistic shaping to a QAM modulation format in accordance with the selected shaping parameter pair. A shaping parameter pair specifying a high shaping strength level and a low error correction strength level may be selected when the measure of fiber nonlinearity is high. A shaping parameter pair specifying a low shaping strength level and a high error correction strength level may be selected when the measure of fiber nonlinearity is low.

20 Claims, 11 Drawing Sheets

(56) References Cited

U.S. PATENT DOCUMENTS

2019/0149393 A1* 5/2019 Yu .................. H04L 27/368
375/296
2019/0182080 A1* 6/2019 Li .................... H04L 25/03292

OTHER PUBLICATIONS

Fehenberger, Tobias, et al. "On probabilistic shaping of quadrature amplitude modulation for the nonlinear fiber channel." *Journal of Lightwave Technology* 34.21 (2016): 5063-5073; 11 pages.

* cited by examiner

PROBABILISTIC CONSTELLATION SHAPING FOR OPTICAL NETWORKS WITH DIVERSE TRANSMISSION MEDIA

BACKGROUND

Field of the Disclosure

The present disclosure relates generally to optical communication networks and, more particularly, to probabilistic constellation shaping of modulation formats for optical communication systems with diverse transmission media.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of optical signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency, enabling superchannels to achieve an increase in data capacity. However, the reach of optical signals, even when using superchannels, may still be limited by optical signal-to-noise ratio (OSNR) levels experienced during transmission.

SUMMARY

In one aspect, a method for constellation shaping of quadrature amplitude modulation (QAM) formats in an optical transport network includes selecting a target information rate for the optical transmission path, determining a measure of fiber nonlinearity for transmission media on the optical transmission path, and selecting, dependent on the determined measure of fiber nonlinearity for the transmission media, one of a plurality of supported shaping parameter pairs, each specifying a respective shaping strength level and a respective error correction strength level for the optical transmission path. The method also includes configuring one or more optical transponders to apply probabilistic shaping to a QAM modulation format in accordance with the selected shaping parameter pair when transmitting traffic over the optical transmission path.

In any of the disclosed embodiments, selecting the one of the plurality of supported shaping parameter pairs may be further dependent on the target information rate.

In any of the disclosed embodiments, the method may further include link data indicating a type of optical fiber over which the traffic is carried on the optical transmission path, a dispersion coefficient of an optical fiber over which the traffic is carried on the optical transmission path, a number of spans over which the traffic is carried on the optical transmission path, or a respective length of each of one or more spans over which the traffic is carried on the optical transmission path. Determining the measure of fiber nonlinearity may be dependent on the received link data.

In any of the disclosed embodiments, configuring the one or more optical transponders to apply probabilistic shaping to a QAM modulation format in accordance with the selected shaping parameter pair may include setting a distribution parameter of the probabilistic shaping to a value consistent with the respective entropy associated with the shaping strength level of the selected shaping parameter pair.

In any of the disclosed embodiments, configuring the one or more optical transponders to apply probabilistic shaping to a QAM modulation format in accordance with the selected shaping parameter pair may include configuring a forward error correction encoder to select the respective forward error correction code rate associated with the error correction strength level of the selected shaping parameter pair from among a plurality of supported forward error correction code rates.

In any of the disclosed embodiments, selecting the one of the plurality of supported shaping parameter pairs may include selecting a forward error correction code rate for the shaping parameter pair and calculating a corresponding entropy for the pair dependent on the selected forward error correction code rate and the target information rate.

In any of the disclosed embodiments, selecting the one of the plurality of supported shaping parameter pairs may include selecting an entropy for the shaping parameter pair and calculating a corresponding a forward error correction code rate for the pair dependent on the selected entropy and the target information rate.

In any of the disclosed embodiments, the method may further include selecting the QAM modulation format to which probabilistic shaping is applied from among a plurality of supported QAM modulation formats, the selected QAM modulation format being the one of the supported QAM modulation formats having the highest modulation order.

In any of the disclosed embodiments, the method may include monitoring, subsequent to configuring the one or more optical transponders to apply probabilistic shaping to a QAM modulation format in accordance with the selected shaping parameter pair, optical noise-to-signal for the optical transmission path, and determining that the optical noise-to-signal margin exceeds a target margin. The method may also include repeating said determining a measure of fiber nonlinearity for transmission media on the optical transmission path, said selecting one of a plurality of supported shaping parameter pairs, and said configuring the one or more optical transponders to apply probabilistic shaping to a QAM modulation format in accordance with the selected shaping parameter pair in response to determining that the optical noise-to-signal margin exceeds the target margin.

In another aspect, an optical transport network for constellation shaping of quadrature amplitude modulation (QAM) formats includes an optical transmission path, a plurality of transponders, each operable to apply probabilistic shaping to QAM modulation formats, and each supporting a plurality of shaping strength levels and a plurality of error correction strength levels, and a network management system. The network management system is configured to select a target information rate for the optical transmission path, determine a measure of fiber nonlinearity for transmission media on the optical transmission path, and select, dependent on the determined measure of fiber nonlinearity for the transmission media, one of a plurality of supported shaping parameter pairs, each specifying a respective shaping strength level and a respective error correction strength level for the optical transmission path. The network management system is further configured to configure one or more optical transponders to apply probabilistic shaping to a QAM modulation format in accordance with the selected shaping parameter pair when transmitting traffic over the optical transmission path.

In any of the disclosed embodiments, to select the one of the plurality of supported shaping parameter pairs the network management system may be configured to select a first shaping parameter pair when the measure of fiber nonlinearity for transmission media on the optical transmission path exceeds a predetermined threshold for high fiber nonlinearity, and select a second shaping parameter pair when the measure of fiber nonlinearity for transmission media on the optical transmission path does not exceed the predetermined threshold for high fiber nonlinearity. The respective shaping strength specified for the first shaping parameter pair may be higher than the respective shaping strength specified for the second shaping parameter pair, and the respective error correction strength specified for the second shaping parameter pair may be higher than the respective error correction strength specified for the first shaping parameter pair.

In any of the disclosed embodiments, determination of the measure of fiber nonlinearity may be dependent on a type of optical fiber over which the traffic is carried on the optical transmission path, a dispersion coefficient of an optical fiber over which the traffic is carried on the optical transmission path, a number of spans over which the traffic is carried on the optical transmission path, or a respective length of each of one or more spans over which the traffic is carried on the optical transmission path.

In any of the disclosed embodiments, to configure the one or more optical transponders to apply probabilistic shaping to a QAM modulation format in accordance with the selected shaping parameter pair, the network management system may be configured to, set a distribution parameter of the probabilistic shaping to a value consistent with the respective entropy associated with the shaping strength level of the selected shaping parameter pair, and configure a forward error correction encoder to select the respective forward error correction code rate associated with the error correction strength level of the selected shaping parameter pair from among a plurality of supported forward error correction code rates.

In any of the disclosed embodiments, to select the one of the plurality of supported shaping parameter pairs, the network management system may be configured to select a forward error correction code rate for the shaping parameter pair and calculate a corresponding entropy for the pair dependent on the selected forward error correction code rate and the target information rate, or to select an entropy for the shaping parameter pair and calculate a corresponding a forward error correction code rate for the pair dependent on the selected entropy and the target information rate.

In any of the disclosed embodiments, for each of the plurality of shaping parameter pairs, the respective shaping strength level may be specified in terms of a respective entropy associated with the shaping strength level, and the respective error correction strength level may be specified in terms of a respective forward error correction code rate. As the shaping strength level increases, the respective entropy associated with the shaping strength level decreases. As the shaping strength level decreases, the respective entropy associated with the shaping strength level increases. As the error correction strength level increases, the respective forward error correction code rate associated with the error correction strength level decreases. As the error correction strength level decreases, the respective forward error correction code rate associated with the error correction strength level increases.

In any of the disclosed embodiments, selection of the one of the plurality of supported shaping parameter pairs may be further dependent on an order of the QAM modulation format.

In any of the disclosed embodiments, the one or more transponders may support a plurality of supported QAM modulation formats, and the network management system may be further configured to select the QAM modulation format to which probabilistic shaping is applied from among the plurality of supported QAM modulation formats, the selected QAM modulation format being the one of the supported QAM modulation formats having the highest modulation order.

In any of the disclosed embodiments, the network management system may be further configured to monitor, subsequent to configuring the one or more optical transponders to apply probabilistic shaping to a QAM modulation format in accordance with the selected shaping parameter pair, optical noise-to-signal for the optical transmission path. The network management system may be further configured to determine that the optical noise-to-signal margin exceeds a target margin, and to repeat determination of a measure of fiber nonlinearity for transmission media on the optical transmission path, selection of one of a plurality of supported shaping parameter pairs, and configuration of the one or more optical transponders to apply probabilistic shaping to a QAM modulation format in accordance with the selected shaping parameter pair in response to determining that the optical noise-to-signal margin exceeds the target margin.

BRIEF DESCRIPTION OF THE DRAWINGS

For a more complete understanding of the present invention and its features and advantages, reference is now made to the following description, taken in conjunction with the accompanying drawings, in which.

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
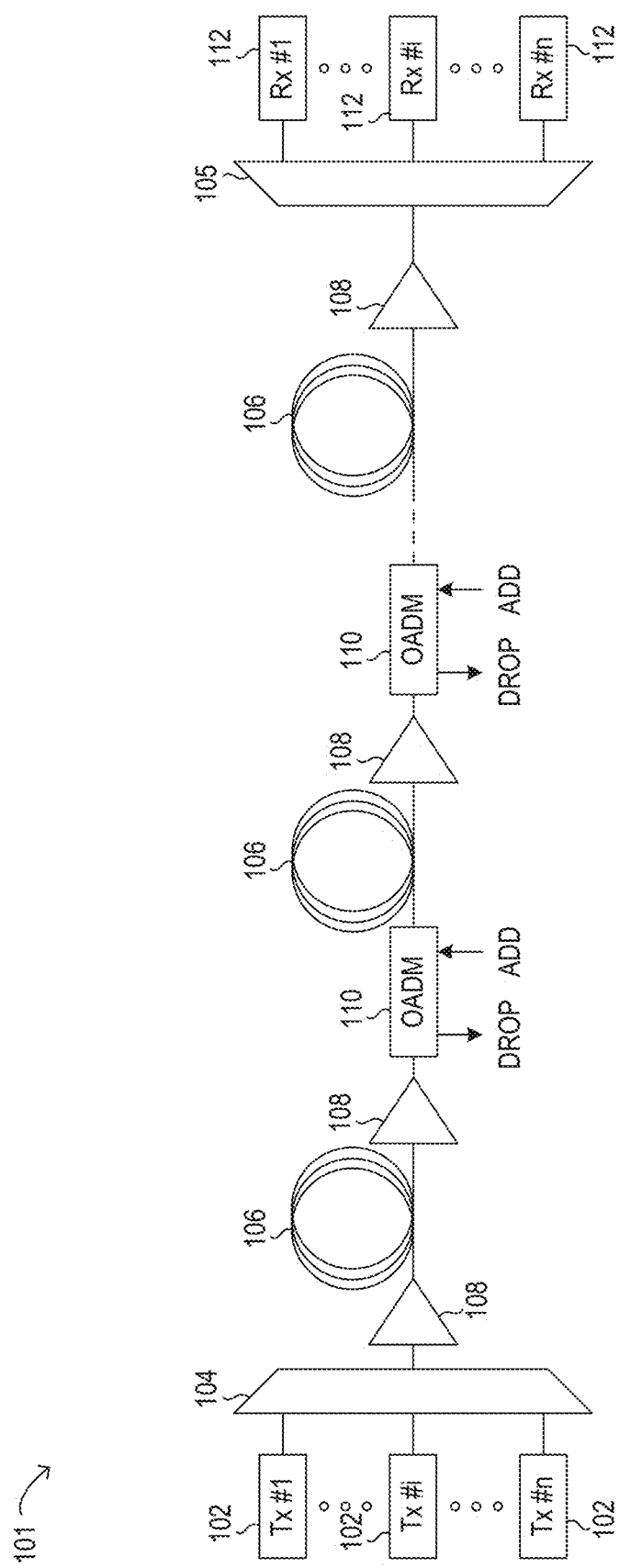
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), Ultra-Large Effective Area Fiber (U-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate.

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which is the portion of the optical fiber that increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WS S).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "MQAM."

Examples of PSK and QAM with a different number of symbols can include binary PSK (BPSK or 2-PSK) using two phases at 0° and 180° (or in radians, 0 and $\pi$) on the constellation diagram; or quadrature PSK (QPSK, 4-PSK, or 4QAM) using four phases at 0°, 90°, 180°, and 270° (or in radians, 0, $\pi/2$, $\pi$, and $3\pi/2$). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, MQAM signals may be polarized using techniques such as dual-polarization 16QAM (DP-16QAM), wherein separate MQAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 4) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 represents a certain transmission capacity for data. As the demand for transmission capacity continues to increase, various methods may be employed to accommodate greater transmission capacity on optical transport network 101. For example, advanced modulation formats, such as 16QAM or 64QAM, may be used to increase transmission capacity per wavelength channel. The advanced modulation formats may be applied using transmitter 102 and receiver 112. However, the use of higher order modulation formats may result in decreased transmission reach (also referred to simply as 'reach') of the optical signal. For example, the reach may be determined by an acceptable value for bit error rate (BER), and accordingly OSNR, which may be observed at receivers 112.

Another strategy for increasing transmission capacity is the use of a superchannel, in which a plurality of subcarrier signals are densely packed in a fixed bandwidth band and may be transmitted at very high data rates, such as 400 Gb/s, 1 Tb/s, or higher. As noted above, optical superchannels may represent a promising solution for transmission of signals at 400 Gb/s and 1 Tb/s data rate per channel. However, as noted above, superchannels are typically used with flexible grid network components, which may not be universally available. Also, administration of superchannels may be associated with additional layers of network management, which may be undesirable in certain networks. While the use of superchannels typically enables an increase in transmission capacity, superchannels do not extend the transmission reach of optical signals using optical transport network 101.

In operation of optical transport network 101, in order to extend the transmission reach of certain optical signals, such as high capacity optical signals modulated using an advanced modulation format, constellation shaping may be applied to the optical signals. In constellation shaping, data bits are mapped and coded into improved constellations that may exhibit improved noise tolerance or increased OSNR. As a result of the improved noise tolerance, the reach of an optical signal in which constellation shaping has been applied may be increased, which is desirable for optical communication using optical transport network 101. In a typical modulation format (such as QPSK or MQAM), the symbols exhibit a uniform distribution in the complex plane, shown as uniformly distribution constellation points in a constellation diagram. When constellation shaping is applied to a modulation format, the distribution of the symbols in the complex plane is changed to provide an improved mapping for noise tolerance. In some instances, the distribution of symbols may be a Gaussian or Gaussianlike distribution that is shown as non-uniform constellation points in the constellation diagram (see also FIG. 3).

As noted above, transmitter 102 may be a universally programmable transceiver for applying different modulation formats, while receiver 112 may include the corresponding functionality for demodulation. Thus, transmitter 102 may support the use of constellation shaping and may be selectively programmed to apply constellation shaping on a per channel basis, while receiver 112 may correspondingly demodulate channels to which a certain kind of constellation shaping has been applied. In various embodiments, transmitter 102 and receiver 112 may include respective mapping/de-mapping functionality, such as within a digital signal processing (DSP) module, to enable implementation of constellation shaping in optical transport network 101.

In one example, constellation shaping may involve superposition mapping, as described in Equation 1.

$$y = y_I + jy_Q = \sum_{n=1}^{N} e^{j\pi b_n} h_n \qquad \text{Equation (1)}$$

In Equation 1:
y is the optical signal comprised of modulated symbols;
$y_I$ and $y_Q$ are the in-phase (real) and quadrature (imaginary) quadrature components;
N is the number of bits per symbol;
$b_n$ are the encoded binary bits; and
$h_n$ represents a weighted symbol mapping scheme, given by $h_n = \alpha_n e^{j\Theta_n}$, where $\alpha_n$ is an amplitude power factor and $\Theta_n$ is a phase power factor.

In this example, $h_n$ allocates a certain amplitude and phase to each symbol. By tuning the amplitude power factor $\alpha_n$ and the phase power factor $\Theta_n$, different superposition mapping schemes can be implemented. For example, in superposition coded mapping using phase-shifted modulation (PSM), the amplitude power factor $\alpha_n$ is kept constant and the phase power factor $\Theta_n$ is uniformly distributed in the complex plane. Additionally, different encoding schemes may be applied prior to superposition mapping, such as superposition coded mapping using bit-interleaved coded modulation. It is noted that when superposition mapping is used in a non-bijective (many-to-one) mapping, decoding and de-mapping at the receiver may involve iterative operations.

Other constellation shaping techniques include iterative polar modulation (IPM) and low-density parity check (LPDC) coded modulation with probabilistic shaping. Probabilistic shaping (PS) based on MQAM has been studied as a way to control spectral efficiency with finer granularity and to achieve an improved performance closer to Shannon capacity limit. In one example, PS-MQAM may be implemented using constant composition distribution matching (CCDM). Performing probabilistic shaping based on MQAM may improve utilization of network resources. In some cases, the shaped profile follows a Maxwell-Boltzmann distribution, as shown below.

$$P(x_i) = \frac{e^{-\nu|x_i|^2}}{\sum_{j'=1}^{M} e^{-\nu|x_{j'}|^2}},$$

$\nu$ is a scaling factor determined by average power constraint and SNR

In the equation above, X is a discrete random variable with M possible symbols $\{x_1, x_2, \ldots x_M\}$, and P(X) is a probability mass function representing the probability of each symbol assigned.

In some embodiments, the minimum entropy of probabilistic shaping based on MQAM is 2 bits per symbol (per polarization), which corresponds to QPSK, where entropy, as a measure of information, is defined as the number of bits of information contained in each message or symbol, where channel noise is not considered. This measure is also sometimes referred to as the spectral efficiency or achievable information rate.

In general, probabilistic shaping (PS) of MQAM signals can result in a signal-to-noise (or OSNR) shaping gain $G_S$ of up to 1.53 dB. This shaping gain can be used to extend transmission reach. It has been discovered that shaping gain $G_S$ MQAM signals increases with an increase of modulation order m=log 2M. For example, for 16QAM signals, the entropy is typically 4 bits per symbol, where M is equal to 16 and m is equal to 4. However, probabilistically-shaped MQAM signals may have increased stronger nonlinear noise compared to uniform distribution MQAM signals. As described in more detail herein, in some embodiments, the amount of shaping gain $G_S$, obtained from the linear noise contribution, may be reduced by the OSNR loss due to fiber nonlinear interference ($L_{NLI}$) as follows:

total gain $G_T$ (dB)=$G_S$ (dB)–$L_{NLI}$ (dB)

In addition, higher order PS-MQAM signals (e.g., where M=64, 128, 256, or higher) may benefit from larger shaping gain, but may suffer from a larger nonlinear noise penalty. This may greatly reduce the overall shaping gain and, thus, reduce the benefit of probabilistic shaping. In at least some embodiments, the systems described herein may mitigate these effects to yield an optimized shaping gain $G_S$ for optical transmission paths with diverse transmission media characteristics.

In optical transport network 101, constellation shaping may be activated/deactivated as a procedure in network operations on a per channel basis for a given optical path. In this manner, the available spectrum may be flexibly allocated in terms of bandwidth and constellation shaping to meet various traffic demands, based on specific path information (distance, number/type of co-propagating channels, fiber type, and dispersion map), which may be economically desirable. Furthermore, constellation shaping using universal programmable transceivers in optical transport network 101 may provide improvements in reach with the same electronics and optical components that are already available and installed, which may enable a rapid upgrade to implement constellation shaping.

As noted above, entropy may be defined as the number of bits of information contained in each message or symbol. Entropy may be calculated using the following equation:

$$H(X) = -\Sigma_i P(x_i) \log_2 P(x_i) \qquad \text{Equation (2)}$$

In Equation 2, X is a discrete random variable with M possible symbols $\{x_1, x_2, \ldots x_M\}$, and P(X) is a probability mass function representing the probability of each symbol assigned. For a uniform distribution, Equation 2 becomes:

$$H(X) = -\sum_{i=1}^{M} \frac{1}{M} \log_2 \frac{1}{M} \qquad \text{Equation (3)}$$

or $$\log_2 M = m \text{ (bits/symbol)} \qquad \text{Equation (4)}$$

Figures 2A, 2B:
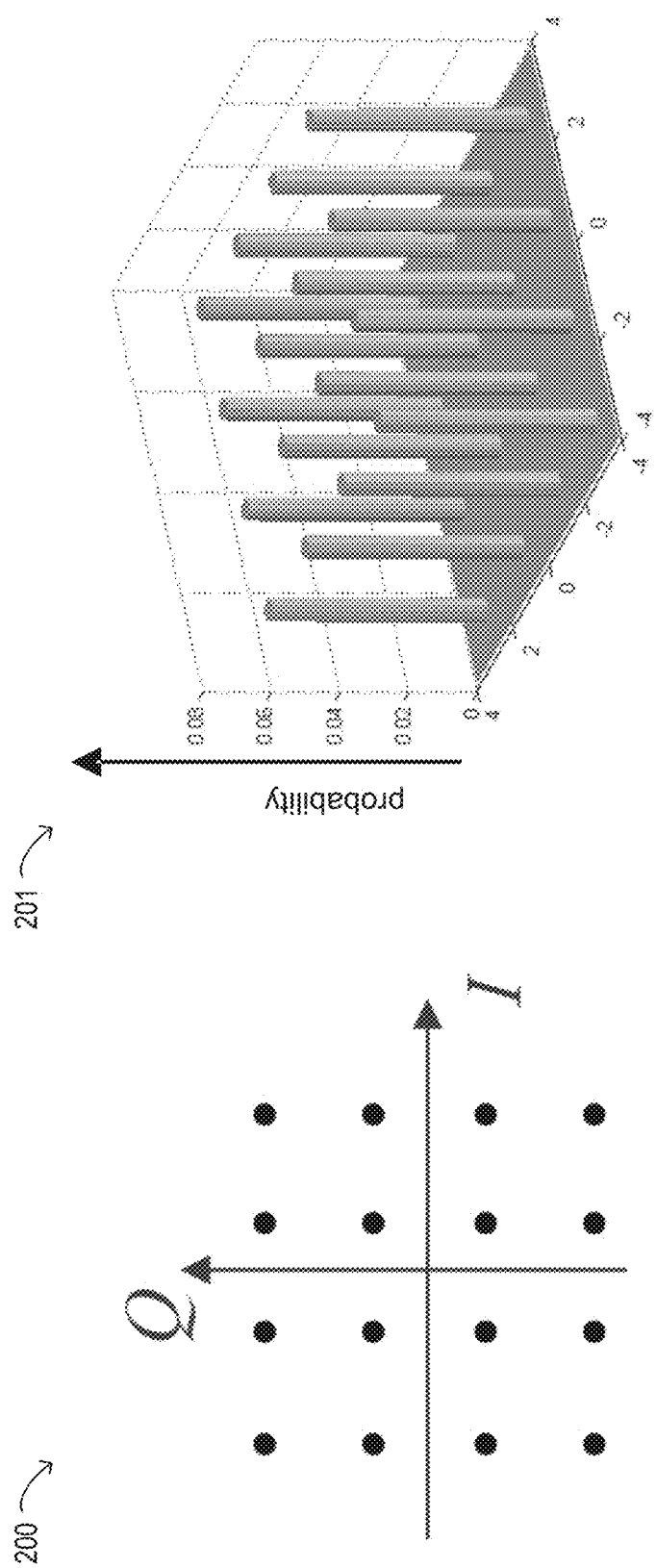
FIG. 2A illustrates selected elements of an embodiment of a constellation diagram in the complex plane.
FIG. 2B illustrates selected elements of an embodiment of a probability distribution diagram corresponding to the constellation diagram illustrated in FIG. 2A.

FIG. 2A illustrates selected elements of an embodiment of a constellation diagram 200 in the complex plane for 16QAM. In constellation diagram 200, a 16QAM constellation is shown having a uniform distribution of the 16 constellation points. In this example, for 16QAM with a uniform distribution, there would be 16 different symbols, each having a probability of $1/16^{th}$. FIG. 2B illustrates selected elements of an embodiment of a probability distribution diagram 201 corresponding to the constellation diagram 200 illustrated in FIG. 2A. The height of each column represents a probability value for a symbol in a corresponding position in constellation diagram 200. In this example, the probability of each symbol assigned is $1/16$ or 0.0625. Plugging the probability $P=1/16$ into Equation 2 above, plugging M=16 into Equation 3 above, or plugging M=16 into Equation 4, as shown below, yields an entropy of four bits per symbol.

$$\log_2 16 = 4 \text{ (bits/symbol)}$$

As will be described in further detail herein, methods and systems are disclosed for the optimization of probabilistic constellation shaping MQAM in optical transport networks, such as optical transport network 101, for optical transport networks with diverse transmission media. The disclosed methods and systems may be used to select, based on a measure of fiber nonlinearity for a given optical transmission path, a suitable shaping parameter pair specifying a shaping strength level and an error correction strength level, to optimize probabilistic shaping for the path. A network management system may select the shaping parameter pair and initiate the configuration of one or more transponders to set the entropy and the forward error correction code rate for the optical path in accordance with the shaping strength level and error correction strength level of the selected shaping parameter pair.

Figure 3:
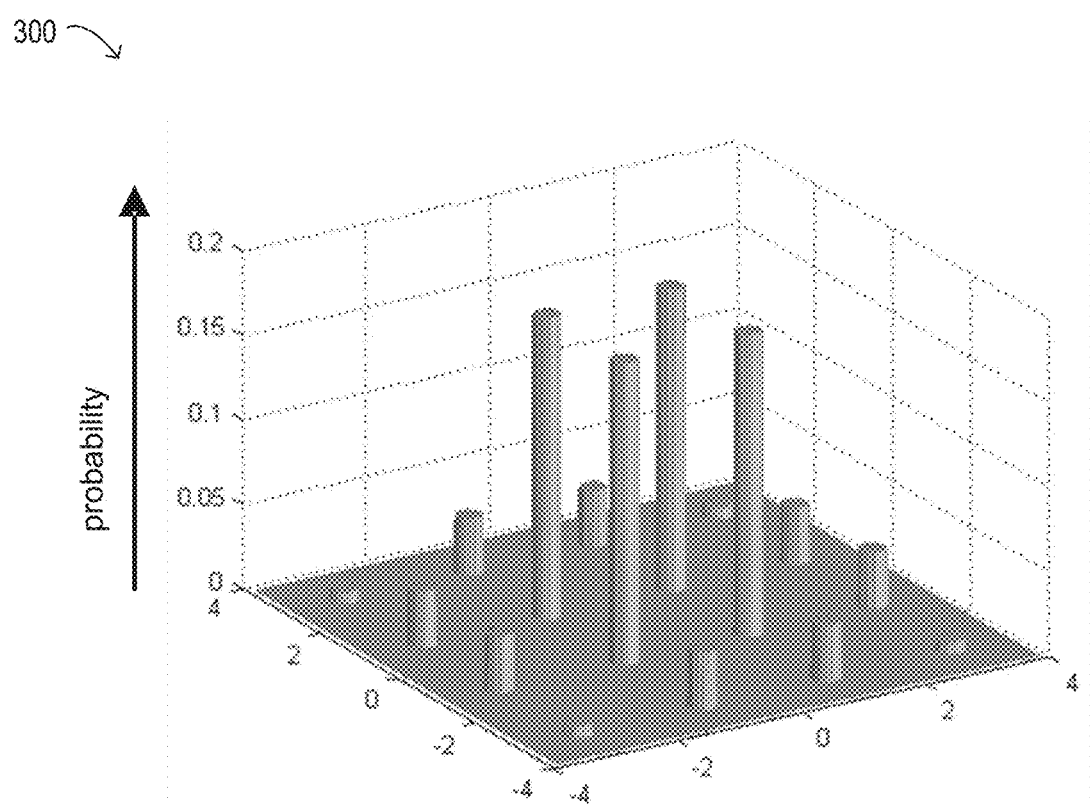
FIG. 3 illustrates selected elements of an embodiment of a probability distribution diagram for constellation points in a probabilistically-shaped 16QAM constellation.

Referring now to FIG. 3, selected elements of an embodiment of a probability distribution diagram 300 for constellation points in a probabilistically-shaped 16QAM constellation are shown. In probability distribution diagram 300, the probabilistically-shaped 16QAM constellation is shown having a non-uniform probability distribution of constellation points as an example of constellation shaping, as disclosed herein. The height of each column represents a probability value for a symbol in a corresponding position in a constellation diagram for 16QAM.

As illustrated in FIG. 3, probabilistic shaping is circularly symmetric, with the probability being dependent on the energy of the symbol. For example, all symbols at a same first distance from the center of the constellation have the same probability. In the illustrated example, probabilistic shaping has been applied to the 16QAM constellation to boost the relative probability of the four innermost symbols (when compared to a uniform distribution), and to decrease the probability of the other symbols. As a result of the shaping, eight symbols at a same second distance from the center of the constellation have the same energy and corresponding probability as each other, both of which are smaller than those of the four innermost symbols. The four outermost symbols at a same third distance from the center of the constellation (shown in FIG. 3 as the corner symbols in probability distribution diagram 300) have the same energy and corresponding probability as each other, and that probability is the smallest of those for the symbols in the constellation.

In an extreme case of probabilistic shaping for 16QAM, the innermost four symbols might each have a probability of 0.25, and all other symbols might have a probability of zero. This extreme case represents the lowest possible entropy of 2 bits/symbol, which corresponds to a QPSK modulation format. In this case, as shown in the equations for calculating entropy above, the number of bits/symbol is smaller than that of uniform 16QAM. Note, however, that in the example illustrated in FIG. 3, none of the symbols has a probability of zero. Therefore, the lowest possible entropy of 2 bits/symbol will not be achieved, in this example. Instead, the achieved entropy may be 3 bits/symbol. Note that by controlling the probability, the actual data rate for transmitting the information encoded in an optical signal may also be controlled.

Figure 4:
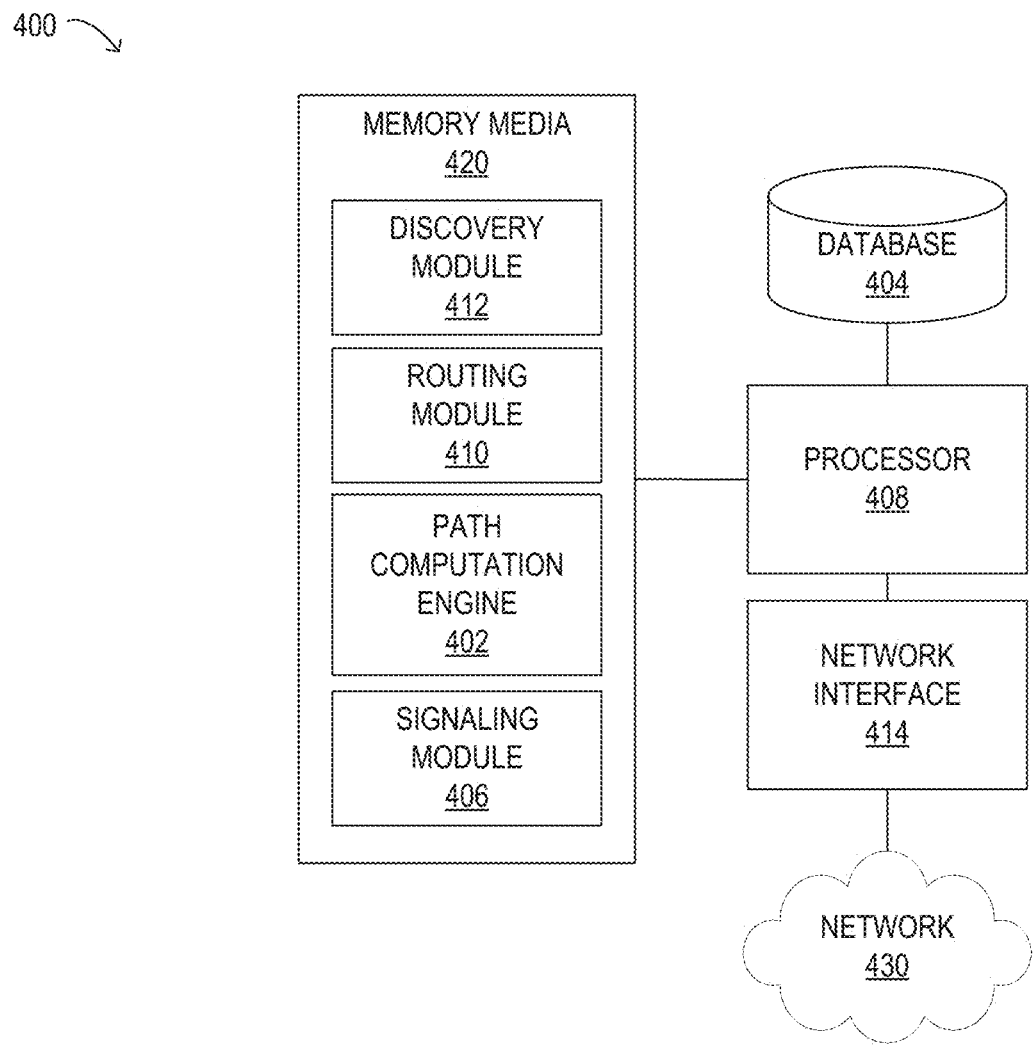
FIG. 4 is a block diagram of selected elements of an embodiment of network management system 300 for implementing control plane functionality in optical networks.

Referring now to FIG. 4, a block diagram of selected elements of an embodiment of network management system 400 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 400 may work together to automatically establish services within the optical network. Discovery module 412 may discover local links connecting to neighbors. Routing module 410 may broadcast local link information to optical network nodes while populating database 404. When a request for service from the optical network is received, path computation engine 402 may be called to compute a network path using database 404. This network path may then be provided to signaling module 406 to establish the requested service.

As shown in FIG. 4, network management system 400 includes processor 408 and memory media 420, which may store executable instructions (i.e., executable code) that may be executable by processor 408, which has access to memory media 420. Processor 408 may execute instructions that cause network management system 400 to perform the functions and operations described herein. For the purposes of this disclosure, memory media 420 may include non-transitory computer-readable media that stores data and instructions for at least a period of time. Memory media 420 may comprise persistent and volatile media, fixed and removable media, and magnetic and semiconductor media. Memory media 420 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 420 is operable to store instructions, data, or both. Memory media 420 as shown includes sets or sequences of instructions that may represent executable computer programs, namely, path computation engine 402, signaling module 406, discovery module 412 and routing module 410.

Also shown included with network management system 400 in FIG. 4 is network interface 414, which may be a suitable system, apparatus, or device operable to serve as an interface between processor 408 and network 430. Network interface 414 may enable network management system 400 to communicate over network 430 using a suitable transmission protocol or standard. In some embodiments, network interface 414 may be communicatively coupled via network 430 to a network storage resource. In some embodiments, network 430 represents at least certain portions of optical transport network 101. In certain embodiments, network 430 may include at least certain portions of a public network, such as the Internet. Network 430 may be implemented using hardware, software, or various combinations thereof.

In certain embodiments, the control plane may be configured to interface with a person (i.e., a user) and receive data about the signal transmission path. For example, the control plane may also include and/or may be coupled to one or more input devices or output devices to facilitate receiving data about the signal transmission path from the user and outputting results to the user. The one or more input and output devices (not shown) may include, but are not limited to, a keyboard, a mouse, a touchpad, a microphone, a display, a touchscreen display, an audio speaker, or the like. Alternately or additionally, the control plane may be configured to receive data about the signal transmission path from a device such as another computing device or a network element (not shown in FIG. 4), for example via network 430.

As shown in FIG. 4, in some embodiments, discovery module 412 may be configured to receive data concerning an optical signal transmission path in an optical network and may be responsible for discovery of neighbors and links between neighbors. In other words, discovery module 412 may send discovery messages according to a discovery protocol, and may receive data about the optical signal transmission path. In some embodiments, discovery module 412 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 4, routing module 410 may be responsible for propagating link connectivity information to various nodes within an optical network, such as optical transport network 101. In particular embodiments, routing module 410 may populate database 404 with resource information to support traffic engineering, which may include link bandwidth availability. Accordingly, database 404 may be populated by routing module 410 with information usable to determine a network topology of an optical network.

Path computation engine 402 may be configured to use the information provided by routing module 410 to database 404 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 402 may consider the interplay between the transmission degradation factors. In various embodiments, path computation engine 402 may generate values for specific transmission degradation factors. Path computation engine 402 may further store data describing the optical signal transmission path in database 404.

In FIG. 4, signaling module 406 may provide functionality associated with setting up, modifying, and tearing down end-to-end networks services in optical transport network 101. For example, when an ingress node in the optical network receives a service request, the control plane may employ signaling module 406 to request a network path from path computation engine 402 that may be optimized according to different criteria, such as bandwidth, cost, etc. When the desired network path is identified, signaling module 406 may then communicate with respective nodes along the network path to establish the requested network services. In different embodiments, signaling module 406 may employ a signaling protocol to propagate subsequent communication to and from nodes along the network path.

In operation of network management system 400, path computation engine 402, or another entity or module, may provide path information associated with a given optical path, such as a distance, a number and type of optical channels to be transmitted, a fiber type, and a dispersion map. For example, signaling module 406, or another entity or module, may receive the path information and may determine the modulation format to be used for a given optical channel and whether or not to apply constellation shaping. In some embodiments, path computation engine 402, or another entity or module, may select a suitable shaping parameter pair based on characteristics of the transmission media and initiate the configuration of one or more transponders to set the entropy and the forward error correction code rate for the optical path in accordance with the shaping strength level and error correction strength level of the selected shaping parameter pair. In order to activate probabilistic constellation shaping, signaling module 406 may send a first command to each transmitter for each of the optical channels, respectively, indicating the modulation format to which probabilistic constellation shaping should be applied, along with the selected entropy and the selected forward error correction code rate. Then, signaling module 406 may send a second command to each receiver corresponding to each transmitter to activate probabilistic constellation shaping. Transmitters and receivers having universal programmable transponder functionality may receive the commands from signaling module 406 and may then activate or deactivate transmission of the optical channels using constellation shaping in accordance with the received commands.

In operation of network management system 400, after an optical path has been provisioned, network management system 400 may configure and/or reconfigure transmitters 102 and receivers 112 to implement a suitable modulation format, symbol rate, entropy, FEC code rate, and amount of optical power transmitted for the optical path as determined by network management system 400 in response to changing conditions. In at least some embodiments, network management system 400 may monitor a bit error rate (BER) or optical signal-to-noise ratio (OSNR) as a quality metric of a received optical channel (e.g., a single carrier or multi-carrier channel) by receiving the BER or OSNR from a receiver DSP (not shown). In some embodiments, network management system 400 may calculate a measure of performance (such as a Q-factor) for an optical path from a monitored measure of performance data received from the receiver DSP or may estimate a measure of performance for an optical path using Gaussian Noise modeling.

Figure 5:
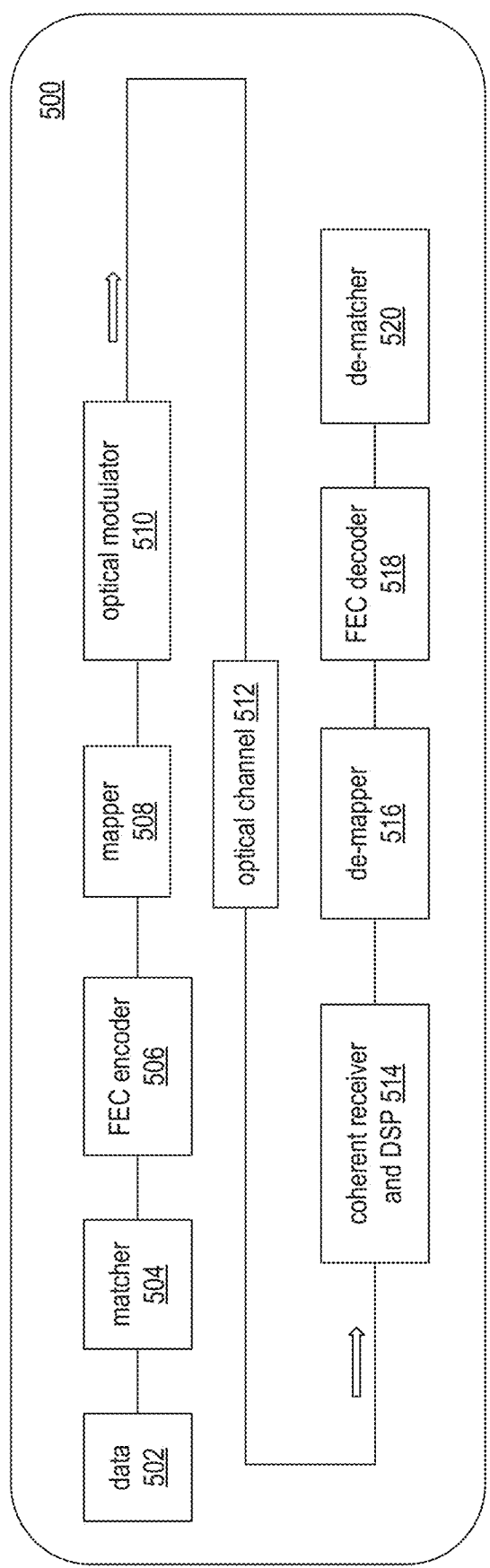
FIG. 5 is a schematic diagram illustrating selected elements of an example embodiment of an optical transmission system configured to apply probabilistic shaping to one or more WDM channels in an optical network.

FIG. 5 is a schematic diagram illustrating selected elements of an example embodiment of an optical transmission system 500 configured to apply probabilistic shaping to one or more WDM channels in an optical network. As illustrated in this example, in some embodiments transmission system 500 includes elements similar to those of a conventional transmitter/receiver including, on the transmitter side, binary data 502 that is provided to optical transmission system 500 for transmission, forward error correction (FEC) encoder 506, mapper 508, and optical modulator 510, an optical channel 512 comprising a suitable transmission media, and, on the receiver side, coherent receiver and DSP element 514, de-mapper 516, and FEC decoder 518.

In order to apply probabilistic shaping, transmission system 500 also includes matcher 504 on the transmitter side and de-matcher 520 on the receiver side. The matcher may ensure sure that the center constellation points have a higher probability of occurrence than the edge constellation points. For example, matcher 504 may be configured to control the probability of occurrence of certain constellation points on the transmitter side to shape the distribution of the constellation points, and de-matcher 520 may be configured to reverse the probabilistic shaping process.

In the illustrated embodiment, matcher 504 receives the binary data 502 and generates data that is modified to achieve a particular probability profile based, for example, on a target probability distribution. Following matcher 504, FEC encoder 506 and symbol mapper 508 may add forward error correction encodings and map portions of binary data 502 (now with probabilities shaped by matcher 504) to respective symbols before providing outputs to optical modulator 510 for transmission over optical channel 512. For example, the mapping may include generating a respective codeword for each symbol and providing data representing the respective codewords mapped to the symbols to the optical modulator 510 for transmission.

In the illustrated embodiment, coherent receiver and DSP 514 may, using de-mapper 514, retrieve the modified and mapped portions of binary data 502 that were provided to optical modulator 510 and transmitted over optical channel 512. Subsequently, this binary data may be processed by FEC decoder 518 and de-matcher 520 to recover the originally received binary data 502.

In various embodiments, coherent receiver and DSP element 514 may include any or all of an I/Q imbalance compensation element, a chromatic dispersion compensation element, an adaptive equalizer, a polarization de-multiplexer, a frequency offset compensation element, a carrier phase recovery element, and/or a cycle slip compensation element.

In one example, probabilistic constellation shaping may be applied in a transponder configured to transmit an optical signal using 64QAM. By apply probabilistic shaping, the spectral efficiency can vary from 64QAM to QPSK (e.g., from 6 bits per symbol per polarization to 2 bits per symbol per polarization) with very fine tuning. In some embodiments, the spectral efficiency may be varied in increments of less than one bit per symbol. For example, instead of the spectral efficiency being configurable with values of just 6 or 5 bits per symbol, the spectral efficiency may be configurable with values of 5.1, 5.5, or 5.9 bits per symbol, as an example. In some embodiments, using matcher 504 and de-matcher 520, one transponder may be able to cover the whole range of spectral efficiency between 2 bits per symbol and 6 bits per symbol.

In some embodiments, the achievable reach for an optical transmission path may be estimated based on the configuration of the links along the path. In addition, the achievable information rate that can be supported on the optical transmission path may be estimated based on the link configuration and a received or estimated OSNR for the path.

Figure 6:
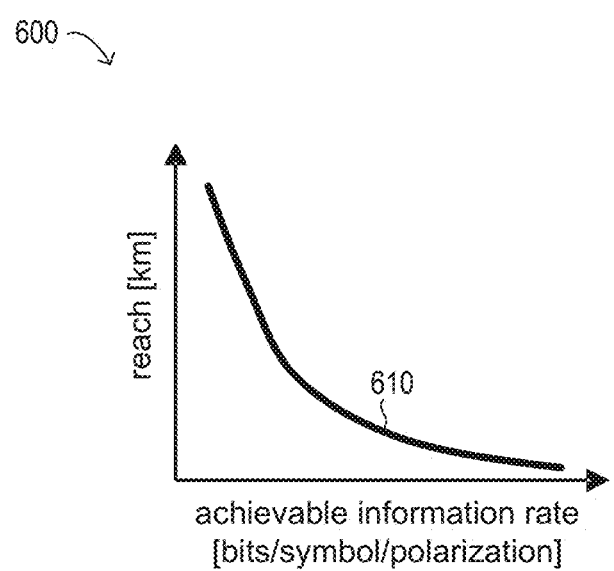
FIG. 6 illustrates an example curve that maps reach versus achievable information rate, or spectral efficiency, in accordance with some embodiments.

FIG. 6 illustrates a plot 600 including an example curve 610 that maps reach (in kilometers) versus an achievable information rate, or spectral efficiency (in bits per symbol per polarization). In some embodiments, the data plotted as curve 610 may be accessed to determine an achievable information rate for a given target reach. In at least some embodiments, this information may also be used to determine a target entropy or a target forward error correction code rate for a given optical transmission path, as described herein.

In at least some embodiments, the methods and systems described herein may be used to optimize probabilistic-shaping-based optical transport networks for maximum shaping gain by adjusting the error correction code rate and by configuring the transponders to apply either weak or strong shaping, depending on the fiber link configuration. More specifically, when the fiber nonlinearity of the transmission media for a given optical transmission path is high, a network management system may cause the transponders to apply strong shaping and weak error correction to maximize the shaping gain. Conversely, when the fiber nonlinearity of the transmission media for a given optical transmission path is low, the network management system may cause the transponders to apply weak shaping and strong error correction to maintain the largest possible shaping gain.

Configuring the transponders to apply strong or weak error correction may involve changing the ratio between information bits and error correction bits, which in turn changes the achievable information rate for the traffic between pairs of transmitting and receiving optical transponders along a transmission path.

In certain embodiments, the optical transponders in an optical transport network may be capable of adjusting the number of FEC overhead bytes based on monitored performance measures or on a feedback mechanism between communicating pairs of optical transponders or other factors. In at least some embodiments, each of the optical transponders may be enabled to implement two or more modulation formats. For example, each of the transponders may support two or more adaptive modulation formats including, but not limited to, FSK, ASK, BPSK, QPSK, 8QAM, 16QAM, 32QAM, among others. In certain embodiments, an optical transponder may support up to 128 different modulation formats or more. In addition, the optical transponders may be capable of adjusting the symbols rates at which traffic is transmitted over particular optical paths and/or the amount of optical power transmitted. In at least some embodiments, the modulation format, symbol rate, the entropy, the number of FEC overhead bytes (sometimes referred to as the FEC ratio or FEC code rate), and/or the amount of optical power transmitted for a given optical path may be modified by network management system 400 in response to the addition of a new optical path in an optical transport network, the subsequent recalculation of a system margin for an existing path, or other changes in the optical transport network. For example, in certain embodiments, the modulation format, symbol rate, the number of FEC overhead bytes, and/or an amount of optical power transmitted may be modified for an optical path of a given span length that exhibits performance degradation due to nonlinear effects caused by the addition of an optical path or degradation of the transmission media itself.

In at least some embodiments, a target achievable transmission rate (AIR) for probabilistic constellation shaping may be reliably achieved as follows:

$$AIR = H(P) - (1-r) * m [\text{bits/symbol}]$$

Here, the achievable information rate is calculated based on the entropy $H(P)$ of the probabilistically-shaped signal, which represents the number of bits per symbol that can be put in the modulation format. Here, the calculation of AIR is further dependent on the FEC code rate, $r$, and the number of levels, m, in the constellation. For example, when probabilistic shaping is applied to 16QAM, m=4.

In some embodiments, to achieve a particular transmission rate AIR when applying probabilistic shaping to different modulation formats, the FEC code rate, r, may be fixed and the entropy H(P) of the PS-MQAM signals may be changed. For example, the entropy H(P) may be adjusted in the distribution matcher (such as matcher 504 illustrated in FIG. 5), which produces a non-uniform sequence within a block length. The matcher changes the occurrence of each symbol within a block length to adjust the entropy H(P) to the desired level, and lower-energy points are transmitted with higher probability. This is illustrated by way of example in Table 1 below. In the example illustrated in Table 1, the target achievable information rate is 3.3 bits per symbol per polarization, and the FEC code rate is fixed at ¾, representing that for every four bits transmitted, three of them are information bits and one is an error correction bit, such as a parity bit.

TABLE 1

Achieving a given AIR with a fixed FEC code rate

| PS-MQAM | r | m | (1 − r) * m | H(P) | AIR | PS-MQAM |
|---|---|---|---|---|---|---|
| PS-32QAM | 3/4 | 5 | 1.25 | 4.55 | 3.3 | PS-32QAM |
| PS-64QAM | 3/4 | 6 | 1.5 | 4.8 | 3.3 | PS-64QAM |
| PS-256QAM | 3/4 | 8 | 2 | 5.3 | 3.3 | PS-256QAM |

As shown in Table 1, for probabilistically-shaped 32QAM, the entropy would need to be 4.55 per symbol per polarization to meet the target achievable information rate of 3.3 bits per symbol per polarization, given the modulation order, m, of five. For probabilistically-shaped 64QAM, the entropy would need to be increased to 4.8, because the modulation order, m, is six. For probabilistically-shaped 256QAM, the entropy would need to be increased to 5.3, because the modulation order, m, is eight. As shown in this example, in order to meet the same AIR, the transponder may apply successively weaker shaping to successively higher order MQAM modulation formats. In some embodiments, the entropy may be adjusted by adjusting a parameter of the probabilistic shaping through digital signal processing. For example, in some embodiments, the transmitter may apply a Maxwell-Boltzmann Distribution in which the value of a shaping factor can be tuned to achieve the desired entropy.

In some embodiments, to achieve a particular transmission rate AIR when applying probabilistic shaping to different modulation formats, the entropy H(P) of the PS-MQAM signals may be fixed and the FEC code rate, r, may be changed. This is illustrated by way of example in Table 2 below. In the example illustrated in Table 2, the target achievable information rate is 3 bits per symbol per polarization, and the entropy is fixed at 4.

TABLE 2

Achieving a given AIR with a fixed entropy

| PS-MQAM | r | m | (1 − r) * m | H(P) | AIR | PS-MQAM |
|---|---|---|---|---|---|---|
| PS-16QAM | 3/4 | 4 | 1 | 4 | 3 | PS-16QAM |
| PS-32QAM | 4/5 | 5 | 1 | 4 | 3 | PS-32QAM |
| PS-64QAM | 5/6 | 6 | 1 | 4 | 3 | PS-64QAM |

As shown in Table 2, for probabilistically-shaped 32QAM, the FEC code rate, r, would need to be ⅘ to meet the same target achievable information rate of 3 bits per symbol per polarization as in the case of a modulation format of PS-16QAM and a FEC code rate, r, of ¾. For probabilistically-shaped 64QAM, the FEC code rate, r, would need to be increased to ⅚ to achieve the same AIR. As shown in this example, in order to meet the same AIR, the transponder may apply successively weaker error correction to successively higher order MQAM modulation formats. In the case of 64QAM, an entropy of four bits per symbol per polarization entropy is shown in Table 2, indicating that stronger shaping is applied using the second approach, compared to the case of 64QAM in Table 1, with an entropy of 4.8.

Through experimentation and simulation, it has been discovered that probabilistically-shaped signals with the smaller entropy H(P) (thus, stronger shaping) may have improved tolerance to fiber nonlinearity. In some embodiments, the optical transport networks described herein may be configured to adjust various shaping parameters, including entropy and FEC code rates, to optimize probabilistic shaping dependent on the fiber nonlinearity of the transmission media on particular optical transmission paths. For example, to achieve the same AIR over optical transmission paths with high fiber nonlinearity as over optical transmission paths with low fiber nonlinearly, the transponders may apply weaker error correction (thus, a higher FEC code rate) with a higher normalized generalized mutual information (NGMI) threshold specific to the FEC code rate. In some embodiments, switching to weaker FEC may lead to reduced power consumption, as an added benefit.

Conversely, systems with larger entropy H(P) (thus, weaker shaping) may be slightly more sensitive to fiber nonlinearity. However, this might not be critical in SMF or U-LEAF links with DCM-less transmission due to their inherent high tolerance to fiber nonlinearity. In this case, the impact of the nonlinearity may not be particularly sensitive to the order M of various PS-MQAM signals. In these systems, the transponders may apply stronger error correction (thus, a lower FEC code rate) with a smaller NGMI threshold than in systems with high fiber nonlinearity. In some embodiments, applying stronger error correction may lead to larger shaping gains and FEC gains (thus, smaller ROSNR).

In various embodiments, the techniques described herein may be applied to optical transport networks including transponders of two different transponder configurations, each supporting a variable/switchable FEC code rate and a variable shaping factor (entropy). In transponders of a first configuration, the FEC encoder may support a set of pre-selected code rates, such as ⅔, ¾, ⅘, ⅚, etc., or a variable code rate. The transponders having the first configuration may be designed to support only a single modulation format, such as DP-64QAM, for example. In these transponders, probabilistic shaping may be applied by digitally adjusting the probability of occurrence of each symbol on a constellation diagram, which in turn, changes the entropy H(p) of a signal.

In transponders of a second configuration, the FEC encoder may again support a set of pre-selected code rates, such as ⅔, ¾, ⅘, ⅚, etc., or a variable code rate. The transponders having the second configuration may be designed to support switchable modulation formats, including DP-16QAM, DP-32QAM, DP-64QAM, DP-256QAM, and higher-order MQAM modulation formats, for example. In some embodiments, the selection of the modulation format to which probabilistic shaping is applied may be controlled digitally through software control. In these transponders, probabilistic shaping may be applied to any modulation format by digitally adjusting the probability of occurrence of each symbol on a constellation diagram, which in turn, changes the entropy H(p) of a signal.

Figure 7A:
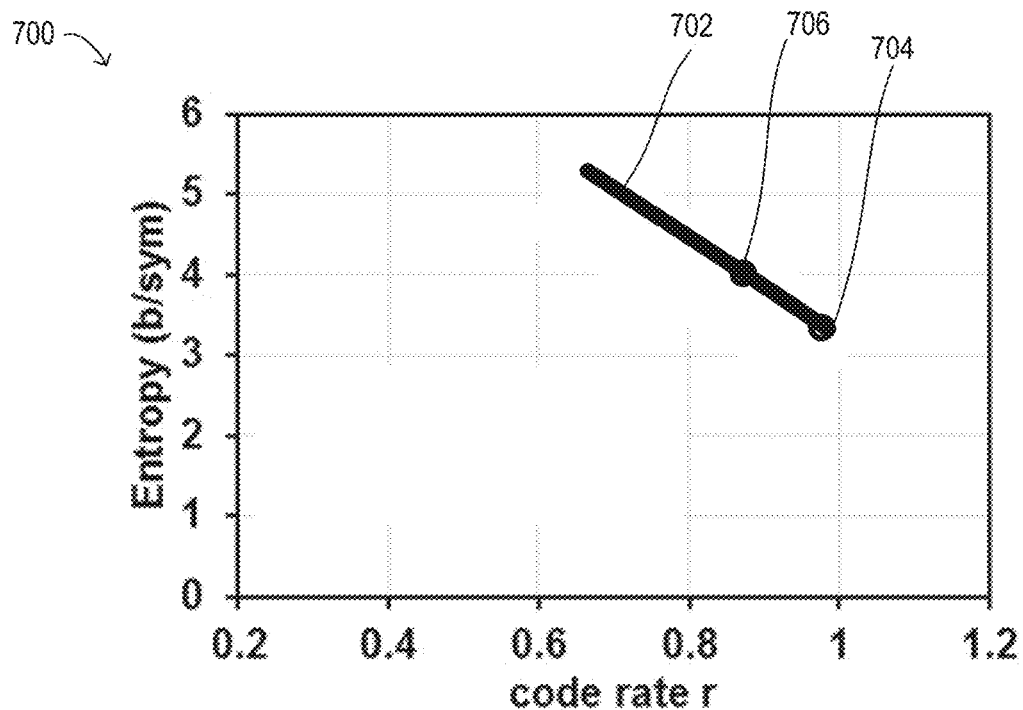
FIGS. 7A and 7B are graphs illustrating shaping parameter pairs for optical transport networks including fiber links with high fiber nonlinearity, according to some embodiments.
Figure 7B:
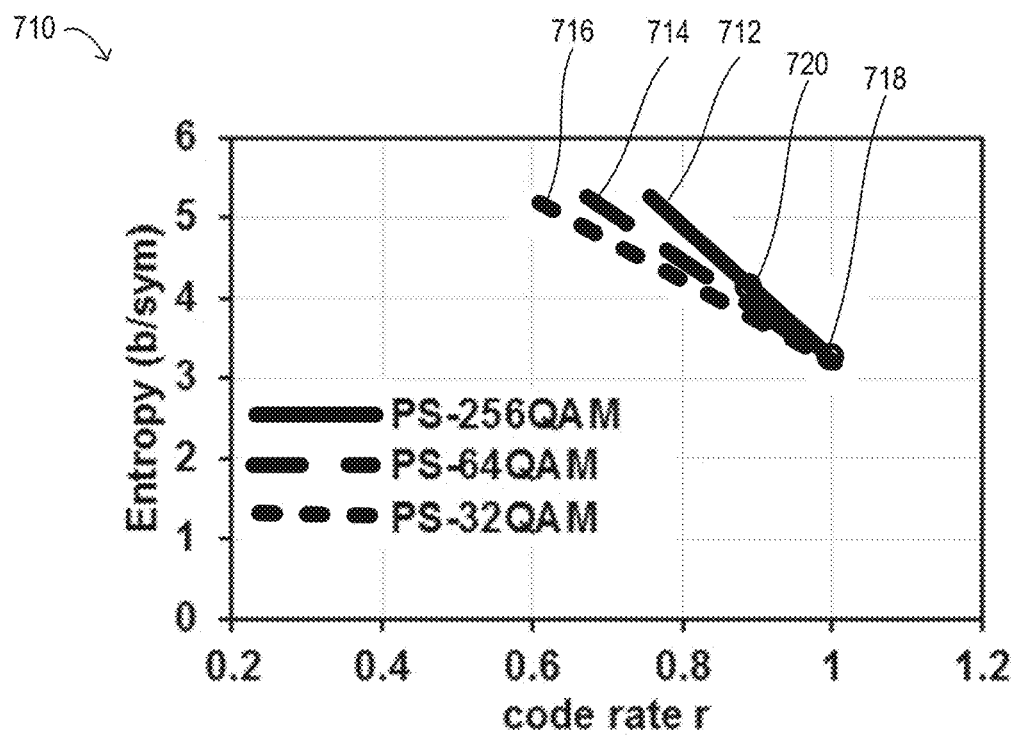

FIGS. 7A and 7B are graphs illustrating shaping parameter pairs for optical transport networks including fiber links with high fiber nonlinearity, according to some embodiments. More specifically, FIG. 7A illustrates an example graph 700 for an optical transport network including transponders of the first configuration that support only a single modulation format (in this case, PS-64QAM) and transmission media with high fiber nonlinearity. For example, the optical transport network, or a particular optical transmission path thereof, may include legacy links with dispersion compensation modules (DCMs), older types of fibers (such as NZ-DSF fibers), or fiber mixes with NZ-DSF fibers being the dominant fiber type and located at the beginning of the link. In this example, the target achievable information rate (AIR) is 3.3 bits/symbol/polarization and probabilistic shaping is to be applied to 64QAM.

In at least some embodiments of the present disclosure, when the transmission media is associated with high fiber nonlinearity, as in this case, the optical transport network may be configured to apply stronger shaping and weaker error correction, as compared to the strength of the shaping and error correction applied in networks with lower fiber nonlinearity, to maximize the shaping gain.

Graph 700 in FIG. 7A illustrates the relationship between entropy and error correction code rates in the example network described above as line 702. In graph 700, probabilistic shaping is stronger as entropy decreases, and error correction is weaker as the error correction code rate increases. In this example, in which the fiber links have relatively high fiber nonlinearity, the optical transport network may be configured to apply strong shaping and weak error correction to maximize shaping gain. Therefore, the optical transport network, or a network management system thereof, may select a shaping parameter pair represented by a point toward the bottom right end of line 700, shown as point 704. At point 704, the entropy is approximately 3.2, and the error correction code rate is approximately 0.95. In some embodiments, the network management system may select a point between the point at which the entropy is approximately 4.0 and the error correction code rate is approximately 0.8, shown as point 706, and point 704.

FIG. 7B illustrates an example graph 710 for an optical transport network including transponders of the second configuration and transmission media with high fiber nonlinearity. As in the previous example, the optical transport network, or a particular optical transmission path thereof, may include legacy links with DCMs, older types of fibers (such as NZ-DSF fibers), or fiber mixes with NZ-DSF fibers being the dominant fiber type and located at the beginning of the link. In this example, the target achievable information rate (AIR) is again 3.3 bits/symbol/polarization. However, in this example, the transponders of the second configuration are configured to support multiple modulation formats, including PS-32QAM, PS-64QAM, and PS-256QAM.

In at least some embodiments of the present disclosure, when the transmission media is associated with high fiber nonlinearity, as in this case, and the transponders are configured to support multiple modulation formats, the optical transport network may be configured to select the highest supported modulation format and then apply stronger shaping and weaker error correction to the selected modulation format, as compared to the strength of the shaping and error correction applied in networks with lower fiber nonlinearity, to maximize the shaping gain.

Graph 710 in FIG. 7B illustrates the relationship between entropy and error correction code rates in the example network described above for three supported modulation formats. More specifically, line 712 is associated with PS-256QAM, line 714 is associated with PS-64QAM, and line 716 is associated with PS-32QAM. As described herein, the network management system may be configured to select the highest-order modulation format supported in the system, in this case, 256QAM, and apply probabilistic shaping to the selected modulation format. In graph 710, probabilistic shaping is stronger as entropy decreases, and error correction is weaker as the error correction code rate increases. In this example, in which the fiber links have relatively high fiber nonlinearity, the optical transport network may be configured to apply strong shaping and weak error correction to maximize shaping gain. Therefore, the optical transport network, or a network management system thereof, may select a shaping parameter pair represented by a point toward the bottom right end of line 710, shown as point 718. At point 718, the entropy is approximately 3.2, and the error correction code rate is approximately 0.95. In some embodiments, the network management system may select a point between the point at which the entropy is approximately 4.0 and the error correction code rate is approximately 0.8, shown as point 720, and point 714 to achieve the maximum shaping gain in light of the fiber nonlinearity.

Figure 8A:
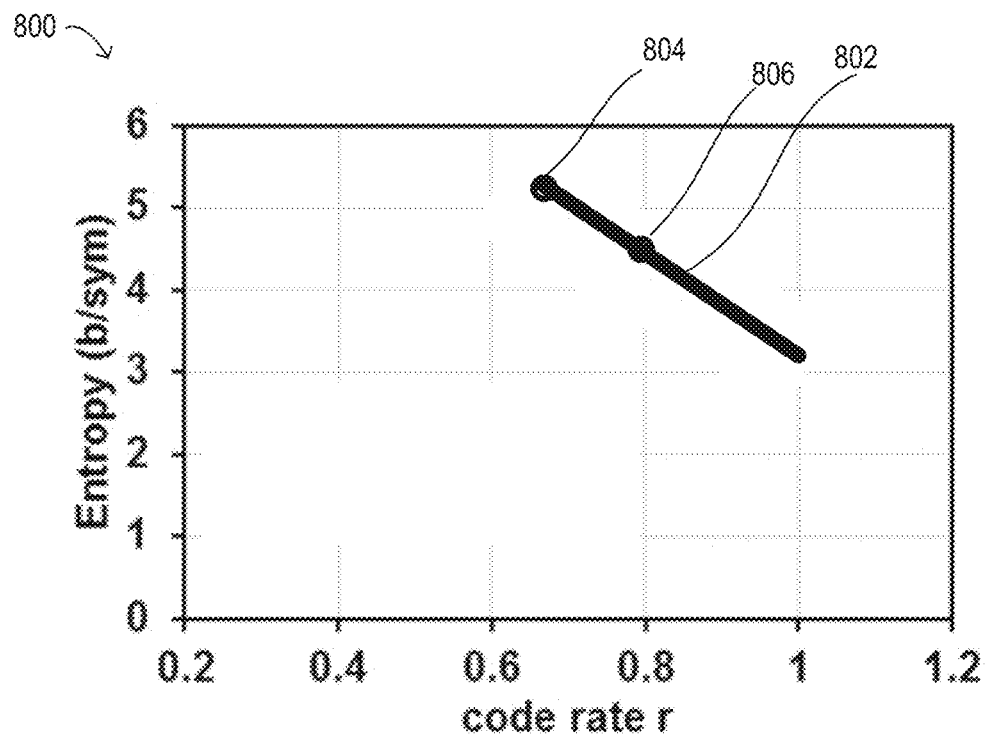
FIGS. 8A and 8B are graphs illustrating shaping parameter pairs for optical transport networks including fiber links with high fiber nonlinearity, according to some embodiments.
Figure 8B:
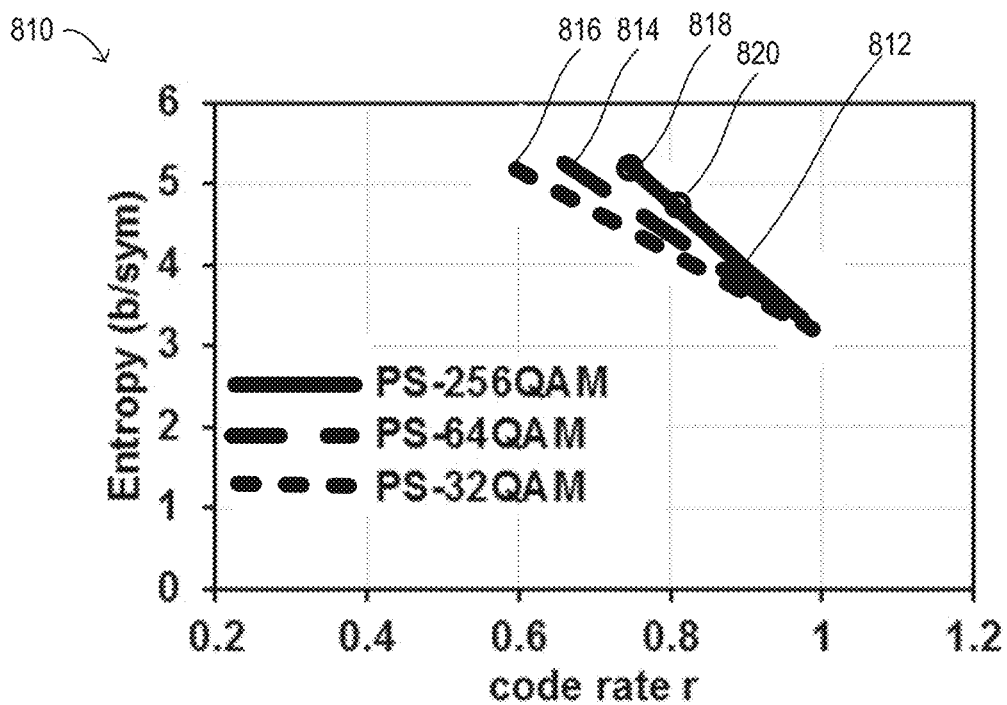

FIGS. 8A and 8B are graphs illustrating shaping parameter pairs for optical transport networks including fiber links with high fiber nonlinearity, according to some embodiments. More specifically, FIG. 8A illustrates an example graph 800 for an optical transport network including transponders of the first configuration and transmission media with low fiber nonlinearity. For example, the optical transport network, or a particular optical transmission path thereof, may include SMF or U-LEAF fiber and DCM-less transmission, or fiber mixes with SMF fibers being the dominant fiber type and located at the beginning of the link. In this example, the target achievable information rate (AIR) is 3.3 bits/symbol/polarization and probabilistic shaping is to be applied to 64QAM.

In at least some embodiments of the present disclosure, when the transmission media is associated with low fiber nonlinearity, as in this case, the optical transport network may be configured to apply weaker shaping and stronger error correction, as compared to the strength of the shaping and error correction applied in networks with higher fiber nonlinearity, to maintain the largest possible shaping gain.

Graph 800 in FIG. 8A illustrates the relationship between entropy and error correction code rates in the example network described above as line 802. In graph 800, probabilistic shaping is weaker as entropy increases, and error correction is stronger as the error correction code rate decreases. In this example, in which the fiber links have relatively low fiber nonlinearity, the optical transport network may be configured to apply weak shaping and strong error correction to maintain the largest possible shaping gain. Therefore, the optical transport network, or a network management system thereof, may select a shaping parameter pair represented by a point toward the top left end of line 800, shown as point 804. At point 804, the entropy is approximately 5.2, and the error correction code rate is approximately 0.7. In some embodiments, the network management system may select a point between point 804 and the point at which the entropy is approximately 4.5 and the error correction code rate is approximately 0.8, shown as point 806.

FIG. 8B illustrates an example graph 810 for an optical transport network including transponders of the second configuration and transmission media with low fiber nonlinearity. As in the previous example, the optical transport network, or a particular optical transmission path thereof, may include SMF or U-LEAF fiber and DCM-less transmission, or fiber mixes with SMF fibers being the dominant fiber type and located at the beginning of the link. In this example, the target achievable information rate (AIR) is again 3.3 bits/symbol/polarization. However, in this example, the transponders of the second configuration are configured to support multiple modulation formats, including PS-32QAM, PS-64QAM, and PS-256QAM.

In at least some embodiments of the present disclosure, when the transmission media is associated with low fiber nonlinearity, as in this case, and the transponders are configured to support multiple modulation formats, the optical transport network may be configured to select the highest supported modulation format and then to apply weaker shaping and stronger error correction, as compared to the strength of the shaping and error correction applied in networks with higher fiber nonlinearity, to maintain the largest possible shaping gain.

Graph 810 in FIG. 8B illustrates the relationship between entropy and error correction code rates in the example network described above for three supported modulation formats. More specifically, line 812 is associated with PS-256QAM, line 814 is associated with PS-64QAM, and line 816 is associated with PS-32QAM. As described herein, the network management system may be configured to select the highest-order modulation format supported in the system, in this case, 256QAM, and apply probabilistic shaping to the selected modulation format. In graph 810, probabilistic shaping is weaker as entropy increases, and error correction is stronger as the error correction code rate decreases. In this example, in which the fiber links have relatively low fiber nonlinearity, the optical transport network may be configured to apply weak shaping and strong error correction to maintain the largest possible shaping gain. Therefore, the optical transport network, or a network management system thereof, may select a shaping parameter pair represented by a point toward the top left end of line 810, shown as point 818. At point 818, the entropy is approximately 5.2, and the error correction code rate is approximately 0.7. In some embodiments, the network management system may select a point between the point at which the entropy is approximately 4.5 and the error correction code rate is approximately 0.7, shown as point 820, and point 818.

Figure 9:
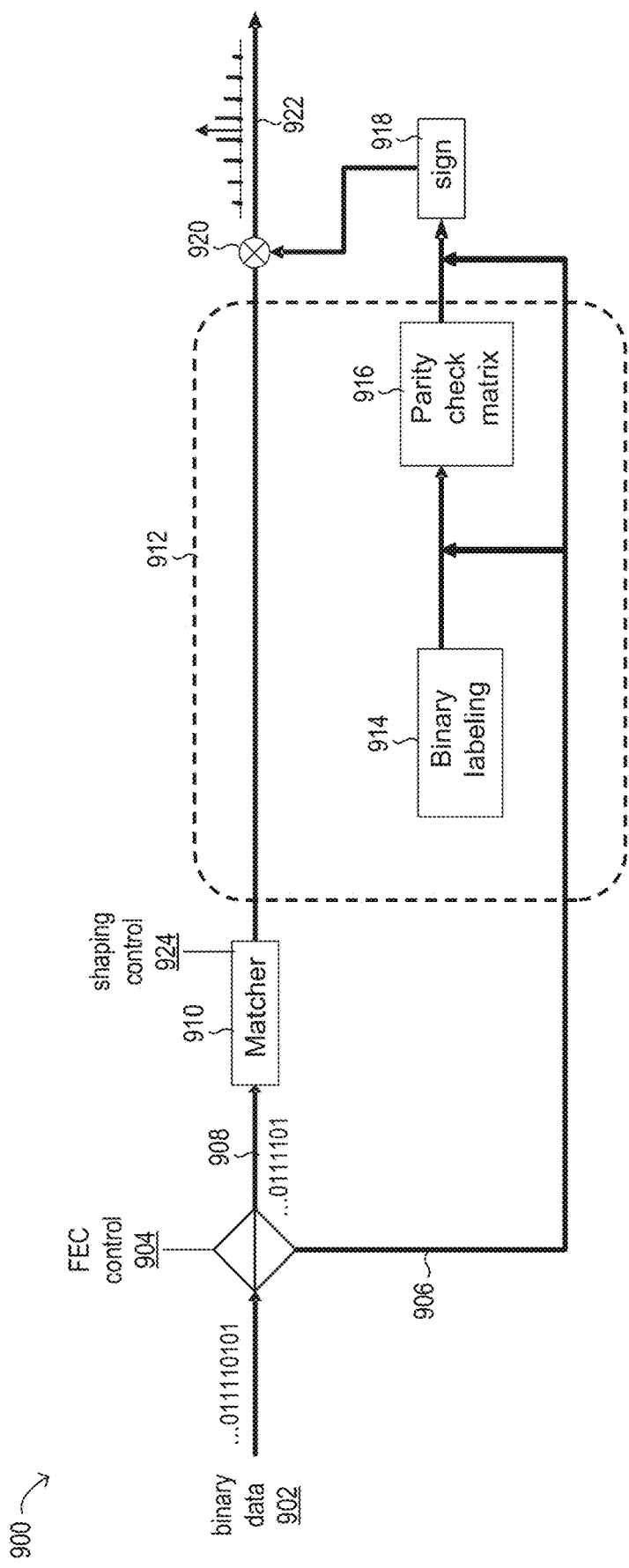
FIG. 9 is a block diagram of selected elements of a transponder for controlling error correction strength, according to some embodiments.

FIG. 9 is a block diagram of selected elements of a transponder 900 for controlling error correction strength, according to some embodiments. As shown in FIG. 9, a portion of the received binary data 902 defined by the error correction code rate may be routed to matcher 910, while the remaining portion of received the binary data 902 bypasses matcher 910. In the illustrated example, bits 906 are error correction bits that bypass the matcher 910, and bits 908 are information bits passed to the matcher 910 for, among other processing, probabilistic shaping. For example, the portion of binary data 902 shown as bits 906 may be calculated as $r*n_c$, where r represents the fraction of data bits that bypass matcher 910 and $n_c$ represents the symbol block size. In some embodiments, bits 906 may include random bits (e.g., with a 50% probability of a '1' for each bit) and sign bits.

In some embodiments, matcher 910 may be similar to matcher 504 illustrated in FIG. 5 and may implement functionality similar to that of matcher 504 to process the information bits 908. For example, matcher 910 may be configured to control the probability of occurrence of certain constellation points on the transmitter side to shape the distribution of the constellation points. A de-matcher of a corresponding receiver (not shown) may be configured to reverse the probabilistic shaping process. In some embodiments, matcher 910 may be configured to apply probabilistic shaping in accordance with the shaping strength level specified in a selected shaping parameter pair for the optical transport path.

In the illustrated example, FEC encoder 912 includes binary labeling element 914 for labeling the shaped QAM symbols and parity check matrix 916. In some embodiments, the size of the parity check matrix may be shown as $(m_b-1+r)*n_c \times m_b*n_c$, wherein $m_b$ represents the number of bits per I- or Q-component of the modulated signal. Note that $m_b=m/2$.

The FEC encoder 912 may be configured to apply forward error correction in accordance with the error correction strength level specified in the selected shaping parameter pair for the optical transport path. In some embodiments, a FEC control signal 904 may control the ratio of information bits and bits used for error correction. In some embodiments, FEC control signal 904 may also control the operation of other elements of FEC encoder 912, such as binary labeling element 914 and parity matrix 916. In some embodiments, the FEC code rate may be shown as $(m_b-1+r)/m_b$, and the minimum code rate may be $(m_b-1)/m_b$.

The output of FEC encoder 912 may include sign bits 918, which are combined, at summing junction 920, with the information bits processed by matcher 910 to produce the probabilistically-shaped and FEC-encoded output 922 in accordance with the selected shaping parameter pair. Also shown in FIG. 9 is shaping control 924, which may be provided to matcher 910 to control the entropy of the probabilistically-shaped signals output by matcher 910 in accordance with the selected shaping parameter pair. In some embodiments, FEC control 904 or shaping control 924 may be provided by a network management system of the optical transport network, such as network management system 400 illustrated in FIG. 4 and described above.

Figure 10:
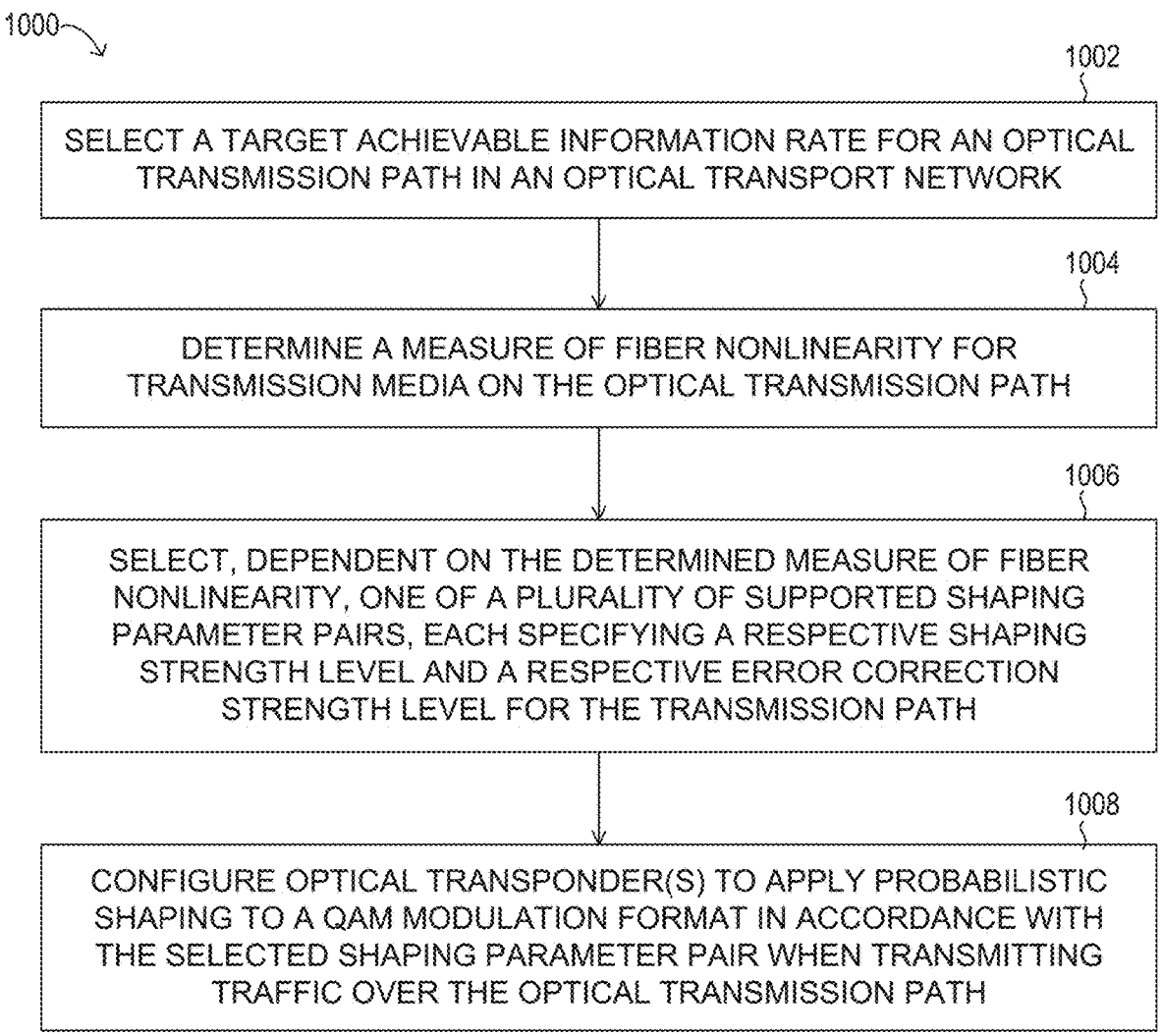
FIG. 10 is a block diagram of selected elements of an embodiment of method for probabilistic constellation shaping for optical networks with diverse transmission media depicted in flowchart form.

FIG. 10 is a block diagram of selected elements of an embodiment of method 1000 for probabilistic constellation shaping for optical networks with diverse transmission media depicted in flowchart form. Method 1000 may be performed using optical transport network 101. In some embodiments, network management system 400 illustrated in FIG. 4 may be used to obtain path information as well as send commands to optical transmitters and optical receivers to configure them to apply probabilistic constellation shaping in accordance with a selected shaping parameter pair, as described herein. Although method 1000 is described in the singular in terms of an optical transmission path among a plurality of optical transmission paths, it will be understood that operations in method 1000 may be repeated or duplicated, either in parallel or in serial, for any plurality of optical transmission paths. It is noted that certain operations described in method 1000 may be optional or may be rearranged in different embodiments.

Method 1000 may begin at 1002 by selecting a target achievable information rate for an optical transmission path in an optical transport network. In some embodiments, the target achievable information rate may be dependent on a target distance for the optical transmission path.

At 1004, the method may include determining a measure of fiber nonlinearity for transmission media on the optical transmission path. In some embodiments, the measure of fiber nonlinearity may be, or may be derived from, a measure of chromatic dispersion for the transmission media.

At 1006, method 1000 may include selecting, dependent on the determined measure of fiber nonlinearity, one of a plurality of supported shaping parameter pairs, each specifying a respective shaping strength level and a respective error correction strength level for the transmission path. In some embodiments, the shaping strength level may be specified in terms of entropy and the error correction strength level may be specified in terms of an error correction code rate.

At 1008, the method may include configuring one or more optical transponders to apply probabilistic shaping to a QAM modulation format in accordance with the selected shaping parameter pair when transmitting traffic over the optical transmission path.

Figure 11:
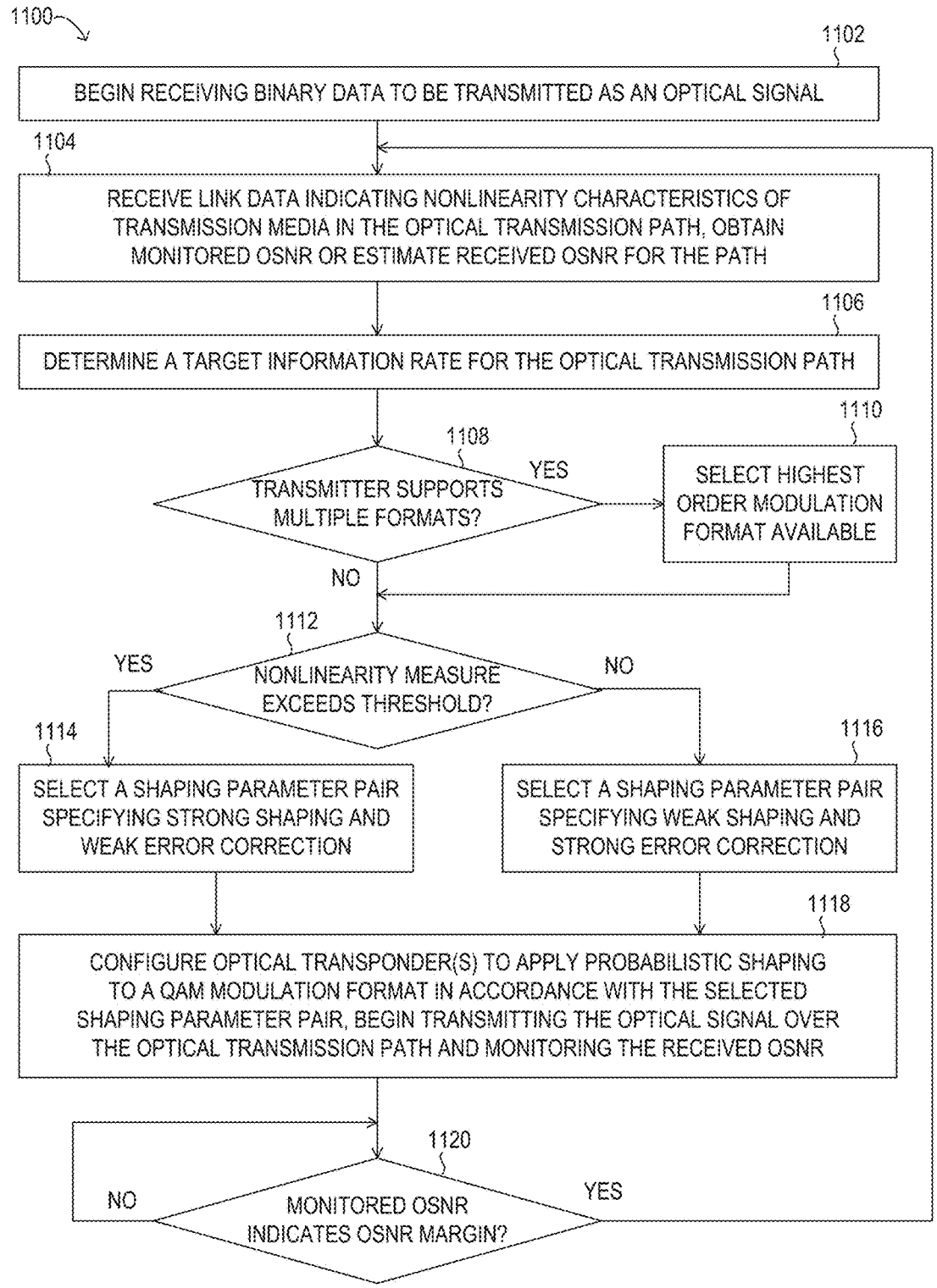
FIG. 11 is a block diagram of selected elements of an embodiment of method for optimizing probabilistic constellation shaping based on properties of the transmission media depicted in flowchart form.

FIG. 11 is a block diagram of selected elements of an embodiment of method 1100 for optimizing probabilistic constellation shaping based on properties of the transmission media depicted in flowchart form. Method 1100 may be performed using optical transport network 101. In some embodiments, network management system 400 illustrated in FIG. 4 may be used to obtain path information as well as send commands to optical transmitters and optical receivers to configure them to select an appropriate shaping parameter pair for an optical transmission path and to apply probabilistic constellation shaping in accordance with the selected shaping parameter pair, as described herein. Although method 1100 is described in the singular in terms of an optical transmission path among a plurality of optical transmission paths, it will be understood that operations in method 1100 may be repeated or duplicated, either in parallel or in serial, for any plurality of optical transmission paths. It is noted that certain operations described in method 1100 may be optional or may be rearranged in different embodiments.

Method 1100 may begin at 1102 by beginning to receive binary data to be transmitted as an optical signal over an optical transmission path.

At 1104, the method may include receiving link data indicating nonlinearity characteristics of the transmission media in the optical transmission path, and, in at least some embodiments, obtaining a monitored or estimated received OSNR. For example, the received link data may include data indicating a type of optical fiber over which the traffic is carried on the optical transmission path, a dispersion coefficient of an optical fiber over which the traffic is carried on the optical transmission path, a dispersion map, a number of spans over which the traffic is carried on the optical transmission path, or a respective length of each of one or more spans over which the traffic is carried on the optical transmission path, some of which may be indicative of, or may be used to calculate, a measure of fiber nonlinearity for the optical transmission path. In some embodiments, an observed, estimated, or desired OSNR may be specified in the received transmission request.

At 1106, method 1100 may include determining a target information rate for the optical transmission path. For example, in some embodiments the determination may be dependent on a target distance for the optical transmission path. The determination may be further based, for example, on the received link data If, at 1108, the transmitter supports multiple modulation formats, method 1100 may continue at 1110. Otherwise, the method may proceed to 1112.

At 1110, method 1100 may include selecting the highest order modulation format available, e.g., the highest order modulation format supported by the transponder and/or suitable for the optical transmission path based on the target information rate, the target distance for the optical transmission path, or other factors.

If, at 1112, it is determined that a measure of nonlinearity for the transmission media in the optical transmission path exceeds a predetermined threshold, the method may continue at 1114. Otherwise, the method may continue at 1116. In some embodiments, the measure of nonlinearity may be, or may be derived from, a measure of chromatic dispersion. In some embodiments, the measure of nonlinearity may be, or may be derived from, an estimated or monitored OSNR penalty for the optical path. For example, for the same input power, an SMF fiber may have an OSNR penalty due to nonlinearity of 0.5 dB, which may be considered low fiber nonlinearity, while an NZ-DSF fiber may have an OSNR penalty due to nonlinearity of 1.5 dB, which may be considered high fiber nonlinearity. In other embodiments, a different measure of fiber nonlinearity may be used to classify the transmission media of a particular optical transmission as having high or low fiber nonlinearity.

At 1114, method 1100 may include selecting a shaping parameter pair specifying strong shaping and weak error correction, after which the method continues at 1118. For example, the network management system may be configured to select a high value for the error correction code rate and to calculate, based on the selected error correction code rate, target information rate, and modulation order m, a corresponding high value for the entropy, or vice versa.

At 1116, method 1100 may include selecting a shaping parameter pair specifying weak shaping and strong error correction, after which the method continues at 1118. For example the network management system may be configured to select a low value for the error correction code rate and to calculate, based on the selected error correction code rate, target information rate, and modulation order m, a corresponding low value for the entropy, or vice versa.

At 1118, the method may include configuring one or more optical transponders to apply probabilistic shaping to a QAM modulation format in accordance with the selected shaping parameter pair, as described herein. For example, the network management system may generate and provide one or more control signals to various transponders, or elements thereof, to configure them to apply the respective entropy and the respective forward error correction code rate associated with the selected shaping parameter pair. The method may also include beginning to transmit the optical signal over the optical transmission path and beginning to monitor the received OSNR.

If and when, at 1120, the monitored OSNR indicates that there is OSNR margin for the optical transmission path, method 1100 may repeat at least some of the operations shown in FIG. 11 beginning at 1104, as appropriate, to reconfigure and re-optimize the optical network dependent on the current link configuration of the optical transmission path. For example, a change in the link configuration of the optical transmission path may be reflected in the OSNR and the optical transport network, or the network management system thereof, may adapt to the change by repeating the operations shown in FIG. 11 to reconfigure the transponders in response to the change.

In at least some embodiments, the methods and systems described herein may be used to optimize probabilistic-shaping-based optical transport networks for maximum shaping gain by adjusting the error correction code rate and by configuring the transponders to apply either weak or strong shaping, depending on the fiber link configuration. The disclosed methods and systems may be used to select, based on a measure of fiber nonlinearity for a given optical transmission path, a suitable shaping parameter pair specifying a shaping strength level and an error correction strength level, to optimize probabilistic shaping for the path. A network management system may select the shaping parameter pair and initiate the configuration of one or more transponders to set the entropy and the forward error correction code rate for the optical path in accordance with the shaping strength level and error correction strength level of the selected shaping parameter pair. When the fiber nonlinearity of the transmission media for a given optical transmission path is high, the network management system may cause the transponders to apply strong shaping and weak error correction. When the fiber nonlinearity of the transmission media for a given optical transmission path is low, the network management system may cause the transponders to apply weak shaping and strong error correction.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for constellation shaping of quadrature amplitude modulation (QAM) formats in an optical transport network, the method comprising:
    selecting a target information rate for the optical transmission path;
    determining a measure of fiber nonlinearity for transmission media on the optical transmission path;
    selecting, dependent on the determined measure of fiber nonlinearity for the transmission media, one of a plurality of supported shaping parameter pairs, each specifying a respective shaping strength level and a respective error correction strength level for the optical transmission path;
    configuring one or more optical transponders to apply probabilistic shaping to a QAM modulation format in accordance with the selected shaping parameter pair when transmitting traffic over the optical transmission path.

2. The method of claim 1, wherein selecting the one of the plurality of supported shaping parameter pairs is further dependent on the target information rate.

3. The method of claim 1, wherein:
    the method further comprises receiving link data indicating a type of optical fiber over which the traffic is carried on the optical transmission path, a dispersion coefficient of an optical fiber over which the traffic is carried on the optical transmission path, a number of spans over which the traffic is carried on the optical transmission path, or a respective length of each of one or more spans over which the traffic is carried on the optical transmission path; and
    determining the measure of fiber nonlinearity is dependent on the received link data.

4. The method of claim 1, wherein:
    for each of the plurality of shaping parameter pairs:
        the respective shaping strength level is specified in terms of a respective entropy associated with the shaping strength level; and
        the respective error correction strength level is specified in terms of a respective forward error correction code rate;
    as the shaping strength level increases, the respective entropy associated with the shaping strength level decreases;
    as the shaping strength level decreases, the respective entropy associated with the shaping strength level increases;
    as the error correction strength level increases, the respective forward error correction code rate associated with the error correction strength level decreases; and
    as the error correction strength level decreases, the respective forward error correction code rate associated with the error correction strength level increases.

5. The method of claim 4, wherein configuring the one or more optical transponders to apply probabilistic shaping to a QAM modulation format in accordance with the selected shaping parameter pair comprises setting a distribution parameter of the probabilistic shaping to a value consistent with the respective entropy associated with the shaping strength level of the selected shaping parameter pair.

6. The method of claim 4, wherein configuring the one or more optical transponders to apply probabilistic shaping to a QAM modulation format in accordance with the selected shaping parameter pair comprises configuring a forward error correction encoder to select the respective forward error correction code rate associated with the error correction strength level of the selected shaping parameter pair from among a plurality of supported forward error correction code rates.

7. The method of claim 4, wherein selecting the one of the plurality of supported shaping parameter pairs comprises selecting a forward error correction code rate for the shaping parameter pair and calculating a corresponding entropy for the pair dependent on the selected forward error correction code rate and the target information rate.

8. The method of claim 4, wherein selecting the one of the plurality of supported shaping parameter pairs comprises selecting an entropy for the shaping parameter pair and calculating a corresponding a forward error correction code rate for the pair dependent on the selected entropy and the target information rate.

9. The method of claim 1, wherein selecting the one of the plurality of supported shaping parameter pairs is further dependent on an order of the QAM modulation format.

10. The method of claim 1, further comprising selecting the QAM modulation format to which probabilistic shaping is applied from among a plurality of supported QAM modulation formats, the selected QAM modulation format being the one of the supported QAM modulation formats having the highest modulation order.

11. The method of claim 1, further comprising:
    monitoring, subsequent to configuring the one or more optical transponders to apply probabilistic shaping to a QAM modulation format in accordance with the selected shaping parameter pair, optical noise-to-signal for the optical transmission path;
    determining that the optical noise-to-signal margin exceeds a target margin; and
    repeating said determining a measure of fiber nonlinearity for transmission media on the optical transmission path, said selecting one of a plurality of supported shaping parameter pairs, and said configuring the one or more optical transponders to apply probabilistic shaping to a QAM modulation format in accordance with the selected shaping parameter pair in response to determining that the optical noise-to-signal margin exceeds the target margin.

12. An optical transport network for constellation shaping of quadrature amplitude modulation (QAM) formats, the optical transport network comprising:
an optical transmission path;
a plurality of transponders, each operable to apply probabilistic shaping to QAM modulation formats, and each supporting a plurality of shaping strength levels and a plurality of error correction strength levels; and
a network management system configured to:
select a target information rate for the optical transmission path;
determine a measure of fiber nonlinearity for transmission media on the optical transmission path;
select, dependent on the determined measure of fiber nonlinearity for the transmission media, one of a plurality of supported shaping parameter pairs, each specifying a respective shaping strength level and a respective error correction strength level for the optical transmission path;
configure one or more optical transponders to apply probabilistic shaping to a QAM modulation format in accordance with the selected shaping parameter pair when transmitting traffic over the optical transmission path.

13. The optical transport network of claim 12, wherein:
to select the one of the plurality of supported shaping parameter pairs the network management system is configured to:
select a first shaping parameter pair when the measure of fiber nonlinearity for transmission media on the optical transmission path exceeds a predetermined threshold for high fiber nonlinearity; and
select a second shaping parameter pair when the measure of fiber nonlinearity for transmission media on the optical transmission path does not exceed the predetermined threshold for high fiber nonlinearity;
the respective shaping strength specified for the first shaping parameter pair is higher than the respective shaping strength specified for the second shaping parameter pair; and
the respective error correction strength specified for the second shaping parameter pair is higher than the respective error correction strength specified for the first shaping parameter pair.

14. The optical transport network of claim 12, wherein determination of the measure of fiber nonlinearity is dependent on a type of optical fiber over which the traffic is carried on the optical transmission path, a dispersion coefficient of an optical fiber over which the traffic is carried on the optical transmission path, a number of spans over which the traffic is carried on the optical transmission path, or a respective length of each of one or more spans over which the traffic is carried on the optical transmission path.

15. The optical transport network of claim 12, wherein:
for each of the plurality of shaping parameter pairs:
the respective shaping strength level is specified in terms of a respective entropy associated with the shaping strength level; and
the respective error correction strength level is specified in terms of a respective forward error correction code rate;
as the shaping strength level increases, the respective entropy associated with the shaping strength level decreases;
as the shaping strength level decreases, the respective entropy associated with the shaping strength level increases;
as the error correction strength level increases, the respective forward error correction code rate associated with the error correction strength level decreases; and
as the error correction strength level decreases, the respective forward error correction code rate associated with the error correction strength level increases.

16. The optical transport network of claim 15, wherein, to configure the one or more optical transponders to apply probabilistic shaping to a QAM modulation format in accordance with the selected shaping parameter pair, the network management system is configured to:
set a distribution parameter of the probabilistic shaping to a value consistent with the respective entropy associated with the shaping strength level of the selected shaping parameter pair; and
configure a forward error correction encoder to select the respective forward error correction code rate associated with the error correction strength level of the selected shaping parameter pair from among a plurality of supported forward error correction code rates.

17. The optical transport network of claim 15, wherein to select the one of the plurality of supported shaping parameter pairs, the network management system is configured to:
select a forward error correction code rate for the shaping parameter pair and calculate a corresponding entropy for the pair dependent on the selected forward error correction code rate and the target information rate; or
select an entropy for the shaping parameter pair and calculate a corresponding a forward error correction code rate for the pair dependent on the selected entropy and the target information rate.

18. The optical transport network of claim 12, wherein selection of the one of the plurality of supported shaping parameter pairs is further dependent on an order of the QAM modulation format.

19. The optical transport network of claim 12, wherein:
the one or more transponders support a plurality of supported QAM modulation formats; and
the network management system is further configured to select the QAM modulation format to which probabilistic shaping is applied from among the plurality of supported QAM modulation formats, the selected QAM modulation format being the one of the supported QAM modulation formats having the highest modulation order.

20. The optical transport network of claim 12, wherein the network management system is further configured to:
monitor, subsequent to configuring the one or more optical transponders to apply probabilistic shaping to a QAM modulation format in accordance with the selected shaping parameter pair, optical noise-to-signal for the optical transmission path;
determine that the optical noise-to-signal margin exceeds a target margin; and
repeat determination of a measure of fiber nonlinearity for transmission media on the optical transmission path, selection of one of a plurality of supported shaping parameter pairs, and configuration of the one or more optical transponders to apply probabilistic shaping to a QAM modulation format in accordance with the selected shaping parameter pair in response to determining that the optical noise-to-signal margin exceeds the target margin.

* * * * *